F. SCHREYER.
COMBINED MONUMENT, MOUND, AND FLOWER BED.
APPLICATION FILED JUNE 8, 1914.

1,130,203.

Patented Mar. 2, 1915.

Witnesses:
S. Goodman
Chas. W. LaRue

Inventor
Frederick Schreyer
By his Attorney
Benjamin Roman

UNITED STATES PATENT OFFICE.

FREDERICK SCHREYER, OF NEW YORK, N. Y.

COMBINED MONUMENT, MOUND, AND FLOWER-BED.

1,130,203. Specification of Letters Patent. Patented Mar. 2, 1915.

Application filed June 8, 1914. Serial No. 843,667.

*To all whom it may concern:*

Be it known that I, FREDERICK SCHREYER, a citizen of the United States, and resident of the city of New York, in the county of Kings and State of New York, have invented certain new and useful Improvements in a Combined Monument, Mound, and Flower-Bed, of which the following is a specification.

This invention relates to flower beds, and particularly to those that are cultivated upon the grave mounds in connection with the monuments in cemeteries. Such flower beds require regular watering and constant attention in order to maintain the earth thereof properly moistened and the flowers in good condition, and the principal object of my invention is to provide simple, inexpensive, highly efficient, and improved means for automatically maintaining the flower bed properly dampened at all times and without requiring any attention.

Other objects and advantages will hereinafter appear.

Figure 1:
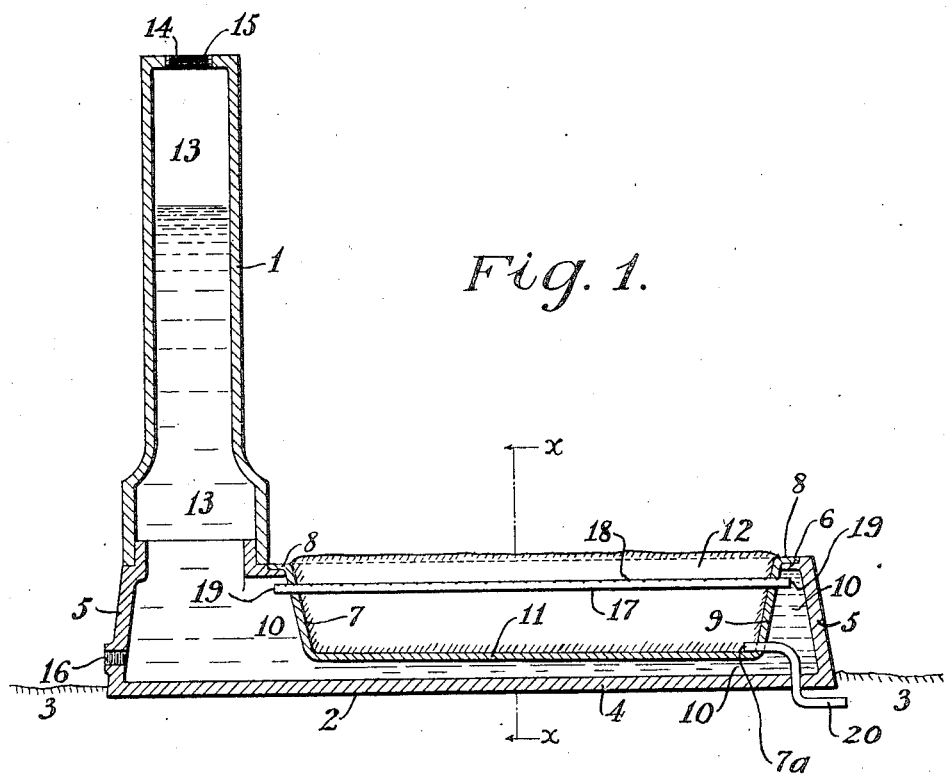
Figure 2:
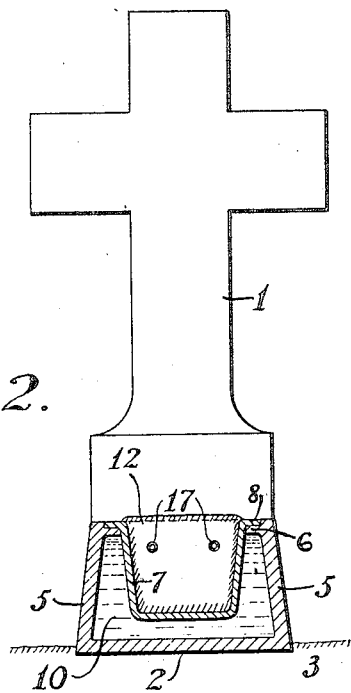

In the accompanying drawings,—Figure 1 is a sectional side elevation of the monument with its base, mound, and flower bed. Fig. 2 is a sectional front elevation taken on the line $x$—$x$ of Fig. 1.

A hollow monument 1, of concrete, cast iron, or other material, has a hollow base 2, which is seated upon the ground 3 over the earth that covers the casket. The base 2 constitutes a receptacle adaptable to contain water and consists of a floor 4 with side walls 5 converging upwardly from said floor and having ledges 6 at their upper extremities. Within the base 2 is placed a receptacle 7 which is supported therein by means of a rim 8 formed on the receptacle walls 9 resting upon the ledges 6, whereby a space 10 within the base 2 completely surrounds the walls 9 and the receptacle floor 11. Said receptacle is preferably of a suitable porous material such as clay or porous concrete, or it may be made of an impervious material and rendered pervious by suitable perforations. The receptacle 7 is filled with earth 12 and together with the base 2 constitutes the grave mound, the earth 12 of which is properly treated and cultivated to form a suitable flower bed.

Water is admitted within the space 13 of the monument 1, either through an opening 14 closed by a cap 15 threading therein or through an inlet 16, and the monument being filled it thus constitutes a reservoir the water from which fills the space 10 within the base 2. The water within the base 2 being under a head of the reservoir in the monument it permeates through the pervious receptacle 7, and entering the earth 12 therein supplies the required moisture thereto and effectively dampens the flower bed.

A pair of pipes 17 having suitable perforations 18 pass through the flower bed 12 and have their extremities 19 passing through the receptacle walls 9 to connect with the water-spaces 10 in the base 2, whereby the water in said base entering the pipes is conducted through perforations 18 to the upper portions of the flower bed and provides an auxiliary supply of moisture thereat in instances where the bed is unusually high or large to be reached effectively by the water permeating the receptacle 7 or where particular flowers are grown thereon that require considerable moisture.

The floor 11 of receptacle 7 slopes downwardly toward the end 7ª of the receptacle, whereat a pipe 20 passing therethrough and outwardly through base-floor 4 conducts into the ground 3 any undue amount of moisture that may sometimes accumulate within the earth in the lower portion of the receptacle 7, particularly after a heavy rain, and by this means a proper balance of the moisture within the earth of the flower bed is at all times maintained.

It will be evident that the water from the reservoir within the monument permeating under a head through the receptacle 7 and through perforations 18 is thereby forced into every portion of the earth and dampens the bed effectively, while the carrying away of any excessive accumulated water at the bottom of receptacle 7 operates to properly balance the moisture therein, whereby a well regulated supply of moisture is continually maintained in the earth and the flower bed is maintained effectively dampened for a long time and without requiring attention.

Variations may be resorted to within the scope of the invention.

Having thus described my invention, I claim:—

1. The combination of a hollow mound-base, a hollow monument superposed on said base and communicating therewith, a pervious receptacle contained within said base, a perforated pipe passing through the upper portion of said receptacle, and a pipe leading from said receptacle to the outside of said base.

2. The combination of a hollow mound-base, a hollow monument superposed on said base and communicating therewith, a pervious receptacle contained within said base, and a pipe leading from said receptacle to the outside of said base.

3. The combination of a hollow mound-base, a hollow monument superposed on said base and communicating therewith, and a pervious receptacle contained within said base.

4. The combination of hollow monument-base having a reservoir portion adaptable to contain a head of water, a pervious receptacle contained within said base adaptable to hold earth, a perforated pipe passing through the upper portion of said receptacle, and a pipe leading from said inner receptacle to the outside of said base.

5. In a flower bed, the combination of an outer receptacle having a reservoir portion adaptable to hold a head of water, a pervious receptacle contained within said outer receptacle adaptable to hold earth, a perforated pipe passing through the upper portion of said inner receptacle, and a pipe leading from said inner receptacle to the outside of said outer receptacle.

Signed at the city of New York, in the county of New York, and State of New York, this 6th day of June, A. D. 1914.

FREDERICK SCHREYER.

Witnesses:
   CHARLES LA RUE,
   B. ROMAN.